United States Patent [19]

Saito et al.

[11] 4,307,951
[45] Dec. 29, 1981

[54] ZOOM LENS SYSTEM FOR CAMERA

[75] Inventors: Kohji Saito, Sayama Kazuo Kondo, Chofu, both of Japan

[73] Assignee: Osawa Precision Industries, Ltd., Tokyo, Japan

[21] Appl. No.: 207,866

[22] Filed: Nov. 18, 1980

[30] Foreign Application Priority Data

Nov. 19, 1979 [JP] Japan .......................... 54-159285[U]

[51] Int. Cl.³ .......................... G02B 15/00; G03B 3/00
[52] U.S. Cl. .................................. 354/195; 350/255
[58] Field of Search ............... 354/195, 196; 350/255, 350/257

[56] References Cited

U.S. PATENT DOCUMENTS

| | | | |
|---|---|---|---|
| 2,484,464 | 10/1949 | Quigley et al. | 350/255 |
| 3,744,884 | 7/1973 | Filipovich et al. | 350/255 |
| 3,931,629 | 1/1976 | Himmelsbach | 354/195 |
| 4,002,405 | 1/1977 | Stahl | 354/195 |

*Primary Examiner*—Donald A. Griffin
*Attorney, Agent, or Firm*—Edwin E. Greigg

[57] ABSTRACT

A zoom lens system for a camera comprises a focusable lens, a variator lens for making a focal length of the lens system variable and a compensator lens for compensating the displacement of its image point caused by the variator lens. A zoom operating sleeve is provided which is rotatable about an optical axis and formed on its inner surface with first and second cam surfaces according to which lens holders for the variator and compensator lenses are respectively controlled in relative movement with the aid of a spring for resiliently urging the lens holders against the cam surfaces.

3 Claims, 2 Drawing Figures

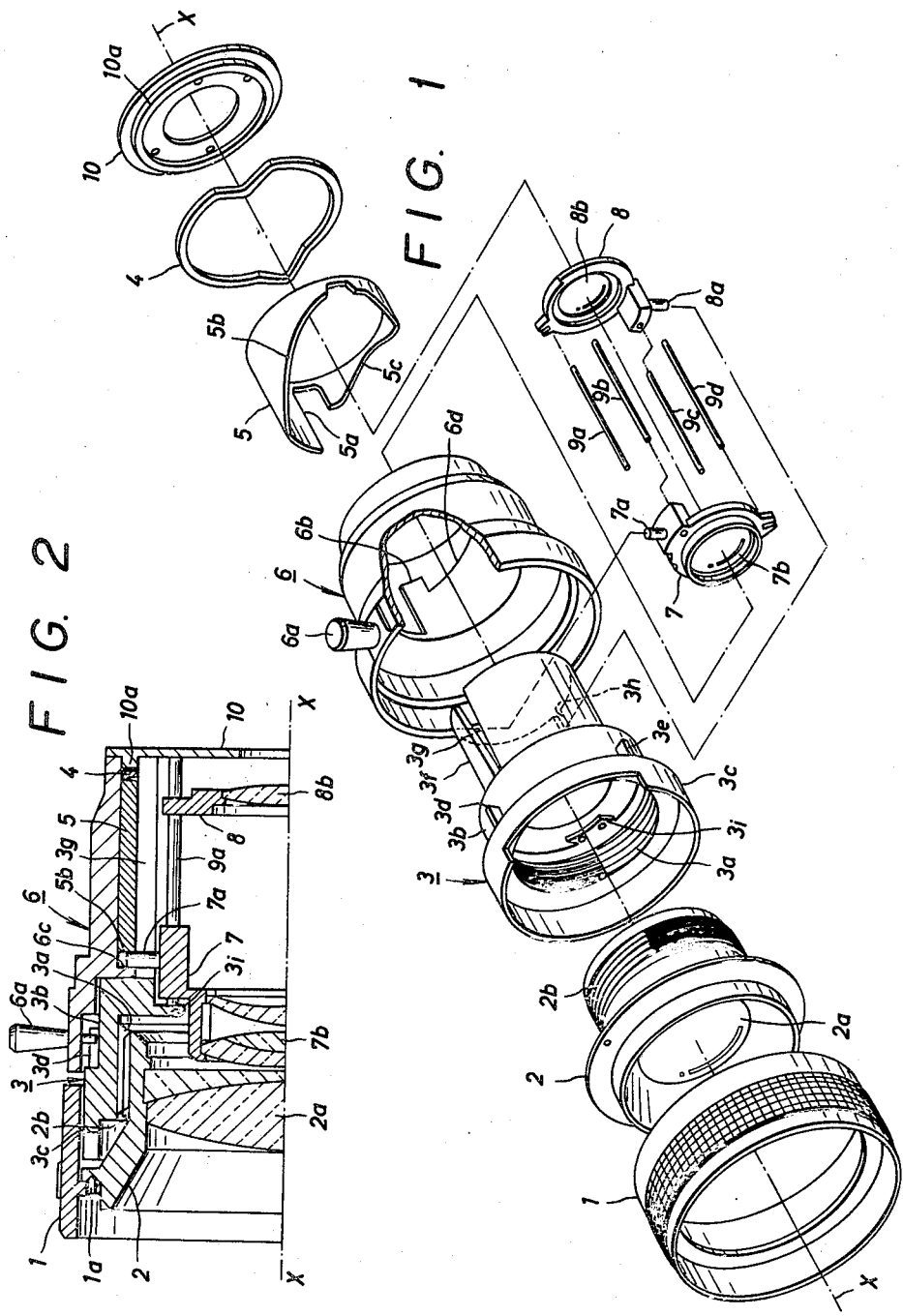

ZOOM LENS SYSTEM FOR CAMERA

BACKGROUND OF THE INVENTION

This invention relates to a zoom lens system for a camera, and more particulartry to a zoom lens system which is capable of effecting precise compensation in a zooming operation.

The typical variable focal length or zoom lens system has a variator lens and a compensator lens. The variator lens serves to vary a magnification factor of image of an object to be photographed, while the compensator lens serves to compensate the displacement of an image point due to the zooming effect of the variator lens so as to bring the object always into focus on a film. For this purpose, the variator and compensator lenses are disposed in camming engagement with a cam tube with grooves which is rotatable for mutually simultaneously effecting predetermined cammed axial movements of the variator and compensator lenses for focusing in a normal zoom range between a telephoto condition and a wide angle condition. The zoom lens system in the prior art thus includes a cam tube which must be provided with precisely formed grooves for guiding the variator and compensator lenses along the optical axis in response to operation of a zooming sleeve for precise compensation in the zooming operation. By reason of precision, it is very difficult to manufacture the cam tube made of plastics in an attempt to produce an economical zoom lens.

On the other hand, a proposal has recently been made in which cam surfaces are provided against which the variator and compensator lenses are resiliently urged by a spring supported at one end thereof on the cam tube and at the other end on a stationary frame. The variator and compensator lenses are thus controlled for axial relative movement according to the cam surfaces rather than according to the grooves or slots on the cam tube. In such an arrangement, the cam tube may advantageously be made of plastics, but a zooming torque for the cam tube fluctuates and the cam tube sometimes undergoes an oscillation because the spring changes in urging force in response to rotation of the cam tube.

SUMMARY OF THE INVENTION

It is therefore an object of the present invention to provide a zoom lens system for a camera which is capable of effecting precise compensation in a zooming operation.

It is another object of the present invention to provide an economical zoom lens system for a camera which has a simple construction and can be manufactured inexpensively.

According to the present invention, a zoom operating sleeve is provided which is rotatable with respect to an optical axis and is formed on its inner surface with first and second cam surfaces. Lens holders for variator and compensator lenses are resiliently urged against the first and second cam surfaces and respectively controlled in relative movement according to the configuration of the cam surfaces in response to the rotation of the zoom operating sleeve. The pressing of the lens holders against the corresponding cam surfaces can be assured by providing a pressing tube which is mounted within the zoom operating sleeve for rotation together with rotation of the zoom operating sleeve and for movement along the optical axis relative thereto. The pressing tube is formed with first and second cam surfaces which are complementary in configuration to the first and second cam surfaces of the zoom operating sleeve, respectively, and presses the lens holders against the first and second cam surfaces of the zoom operating sleeve with the aid of a spring disposed on the other side of the pressing tube.

BRIEF DESCRIPTION OF THE DRAWINGS

The above and other objects of the invention will be more fully understood from the following detailed description of the preferred embodiments thereof taken in connection with the accompanying drawings wherein:

FIG. 1 is a perspective disassembled view showing the arrangement of components of a zoom lens system according to the present invention; and FIG. 2 is an elevational view, in section, of a zoom lens system in which an upper half above its optical axis is shown.

DETAILED DESCRIPTION OF THE PREFERRED EMBODIMENTS

A variable focal length or zoom lens system according to the present invention, as shown in FIGS. 1 and 2, includes a focusing tube 1 which is connected by means of a screw 1a to a focusing cell 2 for holding a focusing lens assembly 2a. The focusing cell 2 is helically threaded on its outer circumferential surface 2b which comes into screwed engagement with a helically threaded inner surface 3a of a barrel 3. The focusing cell 2 rotates about an optical axis X relative to the barrel 3 in response to rotation or adjustment of the focusing tube 1 and effects axial movement along the optical axis X due to its screw engagement with the barrel 3 for focusing of the lens assembly 2a on an object to be photographed.

The barrel 3 includes an axially extending cylindrical tube portion 3b which is formed with the above-mentioned threaded portion 3a on its inner surface. The barrel 3 further includes a cylindrical tube portion 3c which is greater in diameter than the cylindrical tube portion 3b and extends into a space defined by the focusing tube 1 and focusing cell 2. On the cylindrical tube portion 3b there are provided axially extending ridges 3d, 3e which define a space for receiving a knob 6a of a zoom operating sleeve 6 and limit rotation thereof within a range of its circumferential width to control a zooming operation range.

A cylindrical tube portion 3f is, on the other hand, smaller in diameter than the cylindrical tube portion 3b and is formed with elongated grooves 3g, 3h which extend along the optical axis X and receive pins 7a, 8a integrally formed on lens holders 7, 8, respectively. The pins 7a, 8a extend through the grooves 3g, 3h and undergo control of the zoom operating sleeve 6 which will be later described.

The lens holder 7 carries a variator lens assembly 7b which serves to vary the focal length of the zoom lens system and moves along the optical axis to vary the magnification factor of an object image. The lens holder 8, on the other hand, carries a compensator lens 8b which functions to compensate the displacement of its image point due to the zooming operation in such a manner that the image point of the compensator lens 8b, i.e., an object point of a relay lens (not shown) disposed after the compensator lens 8b is always kept spatially constant and the object is brought into focus on a film (not shown) through the relay lens.

In this respect, the compensator lens 8b must be slided along its optical axis X in response to axial movement of the variator lens assembly 7b in predetermined spaced relationship therewith so as to keep its image point always constant spatially, even if the variator lens assembly 7b is moved for zooming operation in response to operation of the zoom operating sleeve 6 from the telephoto to wide angle conditions or vice versa.

This relationship of movements of the variator and compensator lenses 7b, 8b can be achieved by slidably mounting the lens holders 7, 8 on four guide rods 9a–9d each of which is supported at its one end by a supporting disc 10 and at the other end thereof by flange portions 3i provided within the barrel 3, whereby the lens holders 7, 8 effect predetermined relative movements according to cam surfaces of the zoom operating sleeve 6 which will be later described.

A pressing tube 5 has an inner diameter substantially equal to the outer diameter of the cylindrical tube portion 3f of the barrel 3 and is fittedly inserted thereinto. The pressing tube 5 is further formed along its circumferential edge with a recess 5a and cam surfaces 5b, 5c. The recess 5a extends along the optical axis and comes into close engagement with an elongated projection 6b of the zoom operating sleeve 6 formed on the inner surface thereof when the pressing tube 5 is assembled. The cam surface 5b faces a cam surface 6c formed on the inner surface of the zoom operating sleeve 6 and spaces apart therefrom a distance so as to define a space for receiving the pin 7a of the variator lens holder 7. Similarly, the cam surface 5c of the pressing tube 6 defines a space for receiving the pin 8a of the compensator lens holder 8 in cooperation with a cam surface 6d formed on the inner surface of the zoom operating sleeve 6. It will thus be understood that the cam surfaces 5b, 6c and 5c, 6d are complementary to each other in configuration and that the engagement of the projection 6b with the recess 5a allows the pressing tube 5 to move axially along the optical axis X relative to the zoom operating sleeve 6 and follow rotation thereof.

The pressing tube 5 is resiliently urged leftwardly in FIGS. 1 and 2 by a waved annular spring 4 which is mounted on the rear portion of the barrel 3 and accommodated in a space defined by the pressing tube 5 and an annular ridge 10a of the supporting disc 10. This assures close contact of the pins 7a, 8a with the cam surfaces 6c, 6d of the zoom operating sleeve 6 in cooperation with the corresponding complementary cam surfaces 5b, 5c formed on the pressing tube 5. Thus, the rotation of the zoom operating sleeve 6 using the operating knob 6a causes the pressing tube 5 to be rotated and the pins 7a, 8a of the lens holders 7, 8 to be resiliently pressed against the cam surfaces 6c, 6d of the zoom operating sleeve 6. Thus the holders 7, 8 follow the cam surfaces 6c, 6d precisely for predetermined relative movement as mentioned above so that the compensator lens 8b may compensate the zooming effect caused by movement of the variator lens assembly 7b.

The barrel 3 is connected by means of screws to the supporting disc 10 through which the zoom lens system is fixedly connected to a camera body (not shown).

In operation, the focusing tube 1 is adjusted to cause axial movement of the focusing cell 2 along the optical axis X for focusing on the object to be photographed. The zoom operating knob 6a is then operated to rotate the zoom operating sleeve 6 with the pressing tube 5 being rotated therewith to cause the pins 7a, 8a of the lens holder 7, 8 to displace axially according to the precise cam surfaces 6c, 6d of the zoom operating sleeve 6 in cooperation with the cam surfaces 5b, 5c of the pressing tube 5 which is resiliently urged by the waved annular spring 4, thus causing the lens holders 7, 8 to move along the optical axis in predetermined relationship with each other. The cam surfaces 6c, 6d are so precisely formed that the compensator and variator lenses are relatively moved along the optical axis X in such a manner that the compensator lens 8b compensates the displacement of the image point caused by the zooming operation. Thus, the image point of the compensator lens is always kept spatially constant and the displacement of the image point is completely compensated.

As mentioned above, according to the present invention, the zoom lens system is provided in which the relative movement of the variator and compensator lenses is controlled by the cam surfaces, so that the pins integrally formed on the lens holders for the variator and compensator lenses need less precise dimension. This makes it possible to manufacture the lens holders and their pins by use of plastics. Further, less precision is required for the grooves formed on the barrel or cam surfaces on the pressing tube, so that the molding step can be facilitated. Further, the lens holders are resiliently uniformly urged against the cam surfaces by means of the waved annular spring, which undergoes less distortion in the operation of the zoom lens system from the telephoto to wide angle conditions or vice versa. This advantageously keeps the zooming torque constant in the whole range of the zooming operation.

Other modifications may be made without departing from the essential concept of the invention. For example, in the above embodiment, the pins 7a, 8a are pressed against the cam surfaces 6c, 6d by the single pressing tube 5, but it will be apparent that the pressing tube 5 is divided into two portions each of which presses the pin 7a or 8a independently of each other against corresponding cam surfaces to control the lens holders 7, 8, respectively.

What is claimed is:

1. In a zoom lens system for a camera having an optical axis and including a focusing lens which is focusable on an object to be photographed, a variator lens movable along said optical axis for making a focal length of the lens system variable, and a compensator lens movable relative to said variator along said optical axis in predetermined spaced apart relationship with each other for compensating the displacement of an image point caused by said variator, the improvement comprising a lens holder provided with a first pin and movable along said optical axis for carrying said variator lens, a lens holder provided with a second pin and movable along said optical axis for carrying said compensator lens, a zoom operating sleeve rotatable about said optical axis and formed on its inner surface with first and second cam surfaces against which said first and second pins contact and undergo their controls in response to rotation of said zoom operating sleeve, respectively, a pressing tube disposed within said zoom operating sleeve and adapted for rotation together with the rotation of said zoom operating sleeve and for movement along said optical axis relative thereto, said pressing tube being formed with first and second cam surfaces which are complementary in configuration to said first and second cam surfaces of said zoom operating sleeve, and means for resiliently urging said pressing tube to press said first and second pins against the first and second cam surfaces of said zoom operating sleeve and pressing tube, respectively, whereby said lens holders are controlled in relative movement according to said first and second cam surfaces of said zoom operating sleeve.

2. A zoom lens system according to claim 1, wherein said urging means is a waved annular spring which is disposed within said zoom operating sleeve on a side of said pressing tube opposite to said first and second cam surfaces thereof.

3. A zoom lens system according to claim 1, wherein said pressing tube is divided into two portions, one of which presses said first pin against said first cam surface of said zoom operating sleeve and the other of which presses said second pin against said second cam surface thereof.

* * * * *